United States Patent [19]  Books et al.

[11] 3,710,327

[45] Jan. 9, 1973

[54] SYNCHRONOUS COMMUNICATIONS ADAPTER

[75] Inventors: Arlen K. Books; James W. Froemke, both of Rochester, Minn.

[73] Assignee: International Business Machines Corporation, Armonk, N.Y.

[22] Filed: Dec. 14, 1970

[21] Appl. No.: 97,699

[52] U.S. Cl. ............................................340/172.5

[51] Int. Cl. ............................................G06f 11/00

[58] Field of Search ..........178/69; 390/146.1, 172.5; 235/159; 340/173

[56] References Cited

UNITED STATES PATENTS

| | | | |
|---|---|---|---|
| 2,956,124 | 10/1960 | Hagelbarger | 178/69 |
| 3,437,995 | 4/1969 | Watts | 340/146.1 |
| 3,508,197 | 4/1970 | Tong | 340/146.1 |
| 3,103,580 | 9/1963 | Foreman | 235/159 |
| 3,270,324 | 8/1966 | Meade | 340/172.5 |
| 3,054,986 | 9/1962 | Andrews et al | 340/172.5 |
| 3,374,467 | 3/1968 | Cast et al | 340/172.5 |
| 3,274,566 | 9/1966 | McGrogan, Jr. | 340/173 |
| 3,524,169 | 8/1970 | McAuliffe et al. | 340/172.5 |

*Primary Examiner*—Harvey E. Springburn
*Attorney*—Hanifin and Jancin and Keith T. Bleuer

[57] ABSTRACT

A synchronous communications adapter for connecting a CPU with a transmission line including a pair of stop buffers which together contain a 16 bit stop address and a pair of transition buffers which together contain a 16 bit transition address and compare logic of a length equal to the length of only one of the buffers which is multiplexed so as to compare a current address in the local store register to the CPU with both the stop address and the transition address. Also, the compare logic functions to compare received with generated checking characters. A shift register is provided to serialize characters for transmission and assemble characters serially during reception. The shift register in conjunction with other circuitry also functions to generate a pair of block check characters temporarily stored in two block check character buffers having a total length of a conventional 16 bit register. The operation of the single shift register is multiplexed in such a manner that it need only be 8 bits long.

7 Claims, 8 Drawing Figures

INVENTORS
ARLEN K. BOOKS
JAMES W. FROEMKE
BY Keith T. Bleuer
ATTORNEY

SYNCHRONOUS COMMUNICATIONS ADAPTER

BACKGROUND OF THE INVENTION

The invention relates to synchronous communication adapters by means of which central processing units (CPU's) can be connected with data transmission lines for the purpose of transmitting data from one of the adapters to another such adapter or to a terminal.

Such adapters have previously been proposed and used, and these adapters generally contain three shift registers. Two of these shift registers were eight positions in length and a cyclic redundancy code (CRC) register for the purpose of checking was 16 positions in length. The prior adapters thus included a total of 32 shift register positions, a rather expensive construction.

These prior adapters used the cyclic redundancy code (CRC-16) in connection with the 16 position shift register for error checking, this being a reliable method for checking 8 bit code transmission in particular. The method used the polynomial $x^{16}+x^{15}+x^2+1$ equation, which has the prime factors $(x+1)$ and $(x^{15}+x+1)$. A multiplication of these prime factors together gives the equation $x^{16}+x^{15}+x^2+1$ when the binary addition in the multiplication process is done in modulo 2 (with no carry). Using the 16 position bit shift register, 16 shift register stages being required to store and generate 2 BCC bytes, feedback is provided from he first bit position to the 16th bit position of the shift register by exclusively ORing bit position CRC-1 with the input data and the feedback is then exclusively ORed with bit positions CRC-2 and CRC-15 to form an input to bit positions CRC-1 and CRC-14 respectively. The feedback itself is the input to bit position CRC-16, and the 16 bit shift register is shifted once per bit time to accumulate the new transmit or receive bit.

One such prior adapter as just referred to is the International Business Machines (IBM) 2701 Transmission Control Unit which is described in IBM Form No. 27-0024, copyrighted 1968 and entitled "F.E. Theory of Operations, 2701 SYnchronous Data Adapter, Type II"; and the three registers above referred to, which function as a serializer-deserializer in particular, are disclosed on pages 2-4 through 2-18 of this volume

SUMMARY OF THE INVENTION

It is an object of the present invention to provide improved circuitry of this type having only a single 8 position shift register and which is operative in conjunction with associated buffers (which are relatively inexpensive compared to shift registers within the IBM Monolithic System Technology [MST] module set, which is preferably used) for providing an error checking operation. Preferably the block checking method utilizing the CRC-16 cyclic redundancy code and utilizing polynomial $x^{16}+x^{15}\circ x^2+1$ is utilized, this method being particularly suitable for checking 8 bit code transmission.

It is another object of the invention to provide compare logic in such an adapter which has a plurality of different functions of comparing a current address in the CPU local store register with a stop address and with a transition address and which in addition compares an accumulated block check character (BCC) with a received BCC character, when the adapter is provided with such a similar received BCC character from an adapter used for transmitting information. It is contemplated that the addresses may each be 16 bits in length while the compare logic shall be only 8 bits in length, with time multiplexing of the compare logic being utilized for comparing the 16 bit length addresses.

In a preferred form, the circuitry of the invention includes the 8 position shift register having bits shifted out of it to a data carry storage bistable device and a BCC carry storage bistable device. A first BCC buffer (corresponding to the lower 8 positions in the 16 position shift register previously referred to) and a second BCC buffer (corresponding to the higher 8 bits in the 16 bit shift register previously referred to) are provided in connection with the 8 position shift register, and three exclusive OR circuits are provided, one in connection with bit position 1 of the first BCC buffer, the second in connection with bit position 2 of the first BCC buffer, and the third in connection with the seventh bit position of the second BCC buffer, with the interconnections being such that a BCC check character is produced in the two buffers which together are the same as that produced in the 16 bit shift register in prior adapters, so that the same checking is obtained using the 8 bit shift register plus the two buffers as by the 16 bit shift register of the prior adapters. The timing of the CPU and the associated adapter includes first and second BCC phases, and the contents of the shift register is stored in the first BCC buffer during the first BCC phase and the contents of the shift register is stored in the second BCC buffer during the second BCC phase. The circuitry includes compare logic of 8 bits length which not only compares accumulated BCC characters with received BCC characters from a master station but which also compares the current address with a stop address and with a transition address. The stop address is contained in a stop-lo buffer and a stop-hi buffer, and corresponding low and high buffers are provided for the transition address, with each of the addresses being 16 bits in length, with the compare circuitry being multiplexed so as to be effective for comparing the current address with both the stop address and transition address.

DESCRIPTION OF THE PREFERRED EMBODIMENT

Figure 1:
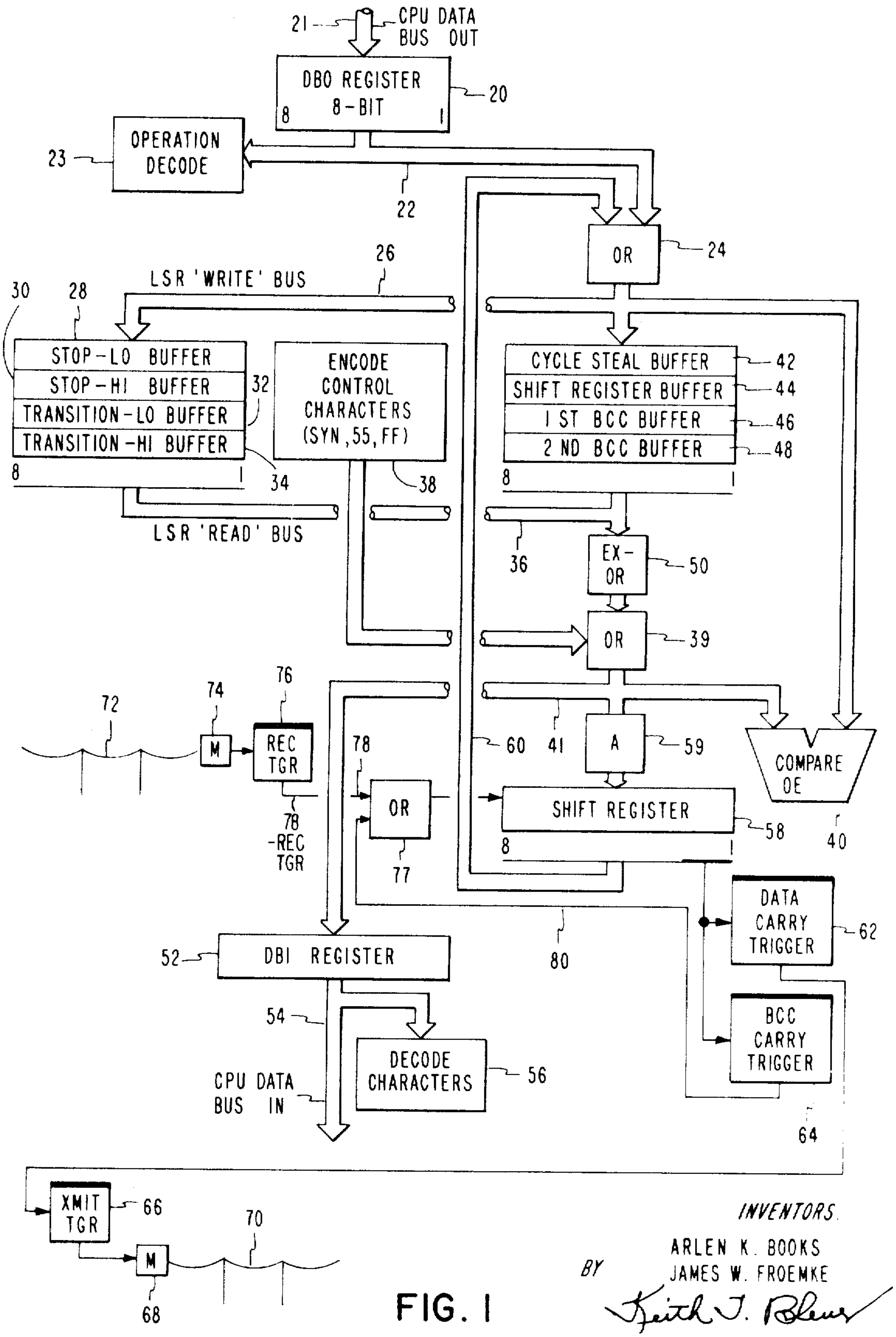
FIG. 1 is a diagram showing the circuitry of the communications adapter of the invention.

Referring to FIG. 1, the communications adapter may be seen to comprise in general a DBO register 20 which receives data from a CPU data bus OUT 21 and which supplies data through bus 22 to operation decode logic 23 and also through OR circuitry 24 to an LSR write bus 26, a stop-lo address buffer 28, a stop-hi address buffer 30, a transition-lo address buffer 32, and a transition-hi address buffer 34. The buffers 28, 30, 32, and 34 supply information to an LSR read bus 36. Encode control characters logic 38 provides information to OR circuitry 39, and compare logic 40 receives information from bus 26 and through bus 41 from the output of OR circuitry 39. A cycle steal buffer 42, a shift register buffer 44, a first BCC buffer 46, and a second BCC buffer 48 receive information from the bus 26 and provide information to the bus 36. Exclusive OR logic 50 is connected to receive information from bus 36 and provide it to OR circuitry 39. An output of OR circuitry 39 is connected by means of bus 41 to a DBI register 52, and register 52 provides information to CPU data bus IN 54. Decode control characters logic 56 is connected to receive information from bus 54. A shift register 58 is connected through AND circuitry 59 to receive information in a broadside manner from OR circuitry 39 and transmits information in the same manner through a bus 60 to OR circuitry 24. A data carry storage trigger 62 and a BCC (block check character) carry trigger 64 are connected to one end of the shift register 58. A transmit trigger 66 is connected to receive data from the data carry trigger 62, and a modem 68 receives data from the transmit trigger 66. The modem 68 modulates information onto a communication line 70. The modem 74 demodulates information from a communication line 72. The modem 74 drives a receive trigger 76 which is connected to the other end of the shift register 58 through OR circuitry 77, and it will be noted also that the BCC carry trigger 64 is also connected with the OR circuitry 77.

The communications adapter as shown in FIG. 1 is connected with a central processing unit (CPU) by means of the bus 21 which may constitute an output channel, and this channel may be also used to connect with other units, such as for example a printer. The channel includes a number of signal carrying lines, such as lines carrying instructions, data, and other signals, and the flow through the bus 21 is from the CPU and to the communications adapter. Various lines in the bus 21 carry ones and zeroes properly coded to correspond with the instructions, data, and signals flowing through the channel. The bus 54 is similar to the bus 21 but instead supplies instructions, data, and signals as input to the associated CPU. The CPU above referred to may, for example, be that disclosed in the copending patent application of E.D. Finnegan, et al. for "Central Processing Unit", Ser. No. 57,920, filed July 24, 1970 and the data bus out 21 and data bus in 54 herein may be connected to I/O channel 15 as disclosed in application, Ser. No. 57,920 and resulting patent. The I/O channel may, for example, be that disclosed in Bunker, et al. U.S. Pat. No. 3,680,054, issued July 25, 1972; and the data bus out 21 herein corresponds with DBO 72 in U.S. Pat. No. 3,680,054 and data bus in 54 herein corresponds with DBI 70 in U.S. Pat No. 3,680,054.

Figure 2:
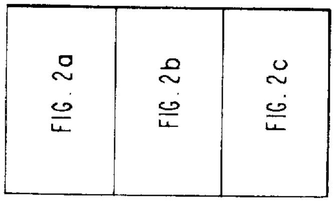
FIGS. 2*a*, 2*b*, and 2*c* when placed in juxtaposition as shown in FIG. 2 constitute a diagram showing portions of the circuitry of the adapter in greater detail.
Figure 2A:
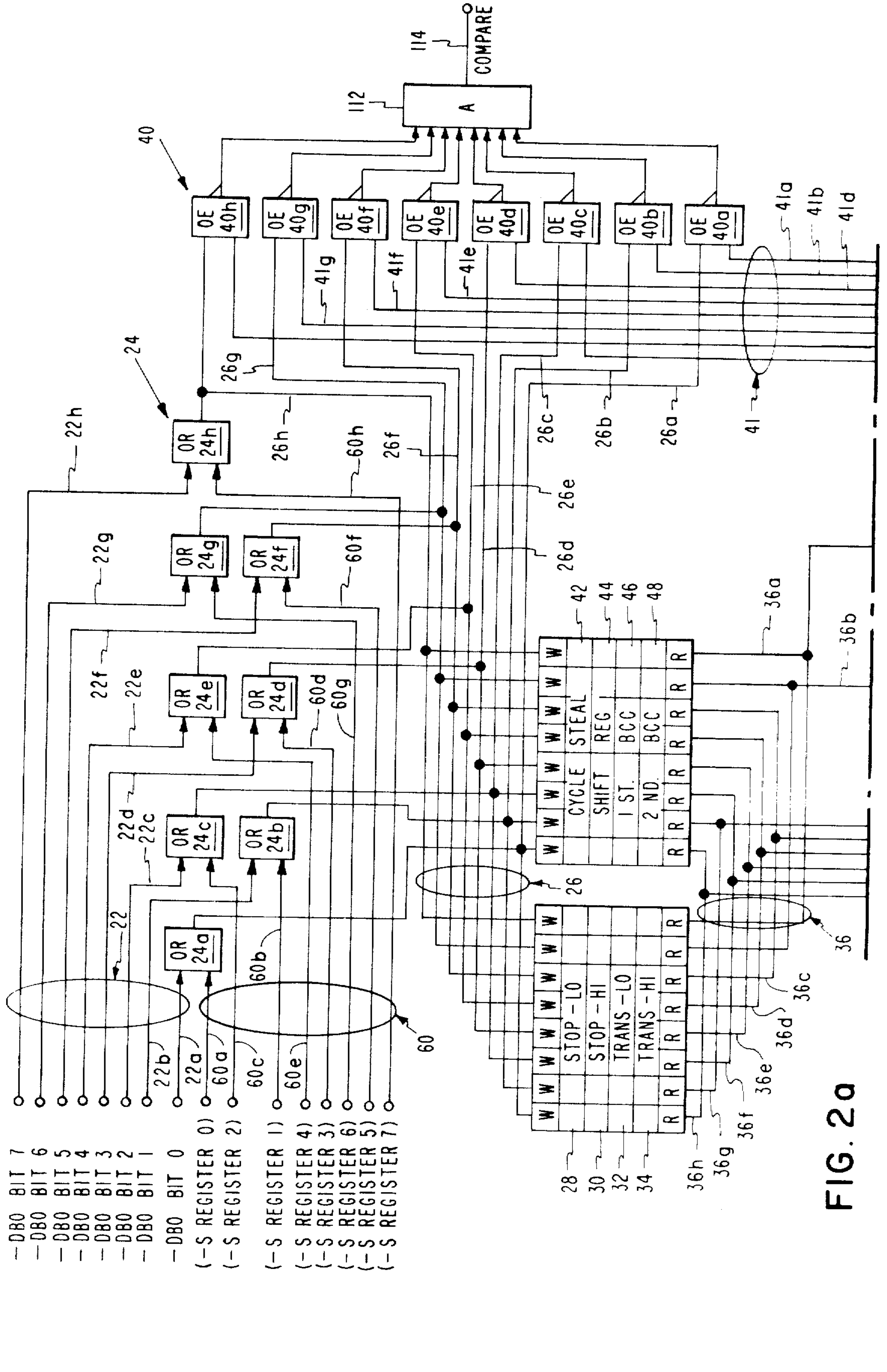
Figure 2B:
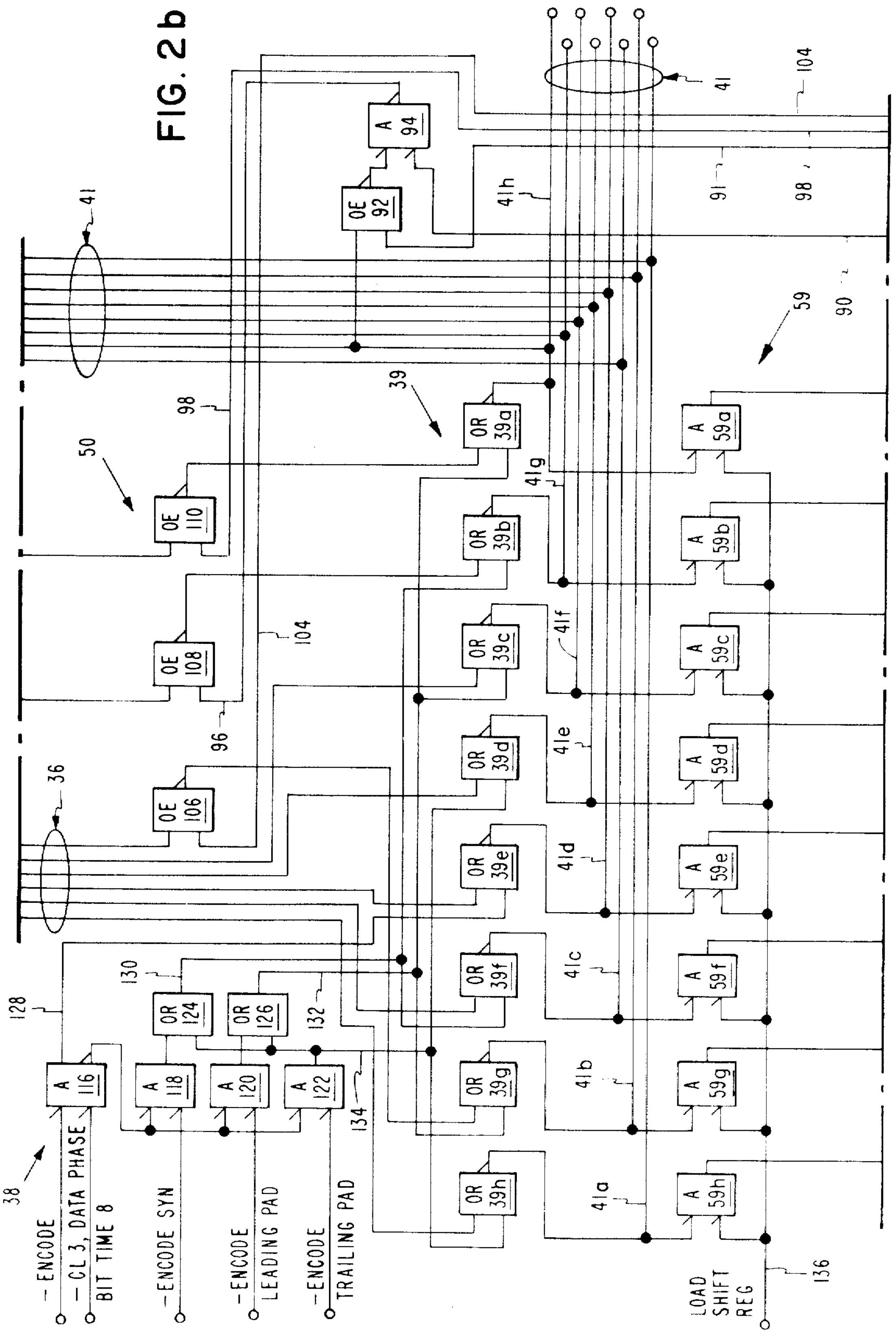
Figure 2C:
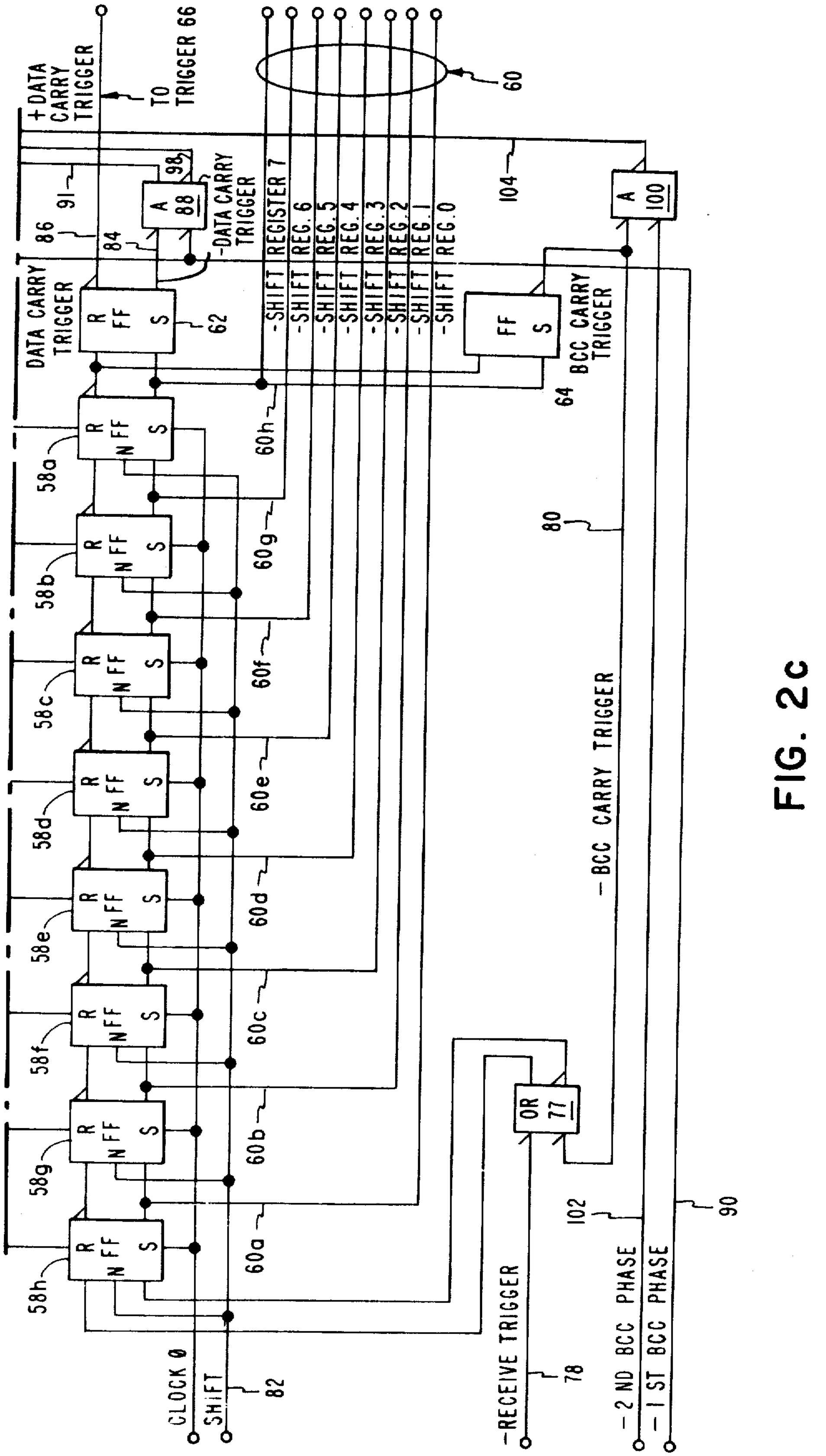

FIGS. 2a, 2b, and 2c show some of the details of various of the circuitry components mentioned above, and referring to these figures, it will be observed that the OR circuitry 24 includes OR circuits 24a, 24b, 24c, 24d, 24e, 24f, 24g, and 24h, and inputs to these circuits are respectively leads 22a, 22b, 22c, 22d, 22e, 22f, 22g, and 22h. These leads are parts of the bus 22 and respectively carry DBO bits, 0, 1, 2, 3, 4, 5, 6, and 7 which have previously been stored in the DBO register 20 and which have been derived from the CPU. Each of the OR circuits 24a to 24h also respectively have as inputs lines 60a, 60b, 60c, 60d, 60e, 60f, 60g, and 60h which are parts of the bus 60 and which carry respectively the bits "minus shift register" 0, 1, 2, 3, 4, 5, 6, and 7 derived from the shift register 58 as will be pointed out in further detail hereinafter.

The buffers 28, 30, 32, 34, 42, 44, 46, and 48 are each simply an 8-bit buffer the bits of which are numbered in a series from 1 to 8. The OR circuits 24a, 24b, 24c, 24d, 24e, 24f, 24g, and 24h have outputs which are respectively lines 26a, 26b, 26c, 26d, 26e, 26f, 26g, and 26h of the bus 26, and these lines are respectively connected to the bits in positions 8, 7, 6, 5, 4, 3, 2, and one of the buffers 28, 30, 32, 34, 42, 44, 46, and 48. The buffers are controlled by any conventional control circuitry and they have outputs in the form of lines 36a, 36b, 36c, 36d, 36e, 36f, 36g, and 36h constituting parts of the bus 36.

The shift register 58 consists of eight triggers (bistable devices operated by a change of potential applied thereto) 58a, 58b, 58c, 58d, 58e, 58f, 58g, and 58h respectively in the 1 – 8 positions of the shift register. The OR circuit 77 is positioned at one end of the shift register, and the OR circuit 77 has input leads 78 and 80. As will be observed from FIG. 1, the lead 78 carries the signal "minus receive trigger", and the lead 80 constitutes the output of the BCC carry trigger 64. The triggers 58a to 58h are all under the control of a shift signal on lead 82, and a shift signal causes bits within the shift register 58 to shift 1 bit at a time to the right as seen in the drawings for each of the shift signals. The outputs of the triggers 58a to 58h are respectively the lines 60a to 60h of the bus 60 which carry the bits "-minus shift register" 0 to 7 applied to the OR circuitry 24 as previously mentioned. The correspondence between the various positions in the shift register 58 and the various bits is thus as follows:

Shift Register Bit 7 = Shift REgister Position 1
Shift Register Bit 6 = Shift Register Position 2
Shift Register Bit 5 = Shift REgister Position 3
Shift Register Bit 4 = Shift Register Position 4
Shift Register Bit 3 = Shift Register Position 5
Shift Register Bit 2 = Shift Register Position 6
Shift Register Bit 1 = Shift Register Position 7
Shift Register Bit 0 = Shift Register Position 8.

The two outputs of the data carry trigger 62 are the leads 84 and 86 carrying the signals "minus data carry trigger" and "plus data carry trigger", and the lead 84 constitutes an input to an AND circuit 88. The second input to the AND circuit 88 is a lead 90 carrying the signal "minus first BCC phase." The AND circuit 88 has an output lead 91 connected to provide an input to an exclusive OR circuit 92, and the other input to the exclusive OR circuit 92 is the line 36a constituting a part of the bus 36 and connected to the first bit positions of the buffers 28, 30, 32, 34, 40, 42, 44, 46, and 48. The output of the exclusive OR circuit 92 constitutes an input to an AND circuit 94, and the second input to the AND circuit 94 is the lead 90 carrying the "minus first BCC phase" signal. The AND circuit 94 provides a feedback signal on an output lead 96, and the AND circuit 88 also provides a feedback signal on another lead 98.

An AND circuit 100 has an input from the BCC carry trigger 64, and the second input to the AND circuit 100 is a lead 102 which carries the signal "minus second BCC phase". The AND circuit 100 provides another feedback signal on its output lead 104.

The exclusive OR circuitry 50 includes exclusive OR circuits 106, 108, and 110. The exclusive OR circuits 106, 108, and 110 respectively have the feedback signal leads 104, 96, and 98 as inputs. The exclusive OR circuit 110 also has the line **36*a* of the bus 36 as an input; the exclusive OR circuit 108 also has the line 36*b* as an input; and the exclusive OR circuit 106 also has the line 36*g* as an input. The lines 36*a*, 36*b*, and 36*g* are respectively connected to the first, second, and seventh bits of the buffers 28, 30, 32, 34, 42, 44, 46, and 48** as is apparent.

The compare circuitry 40 includes the exclusive OR circuits **40*a*, 40*b*, 40*c*, 40*d*, 40*e*, 40*f*, 40*g*, and 40*h*, and these circuits respectively have inputs in the form of lines 26*a*, 26*b*, 26*c*, 26*d*, 26*e*, 26*f*, 26*g*, and 26*h* of the write bus 26 and have their second inputs in the form of lines 41*a*, 41*b*, 41*c*, 41*d*, 41*e*, 41*f*, 41*g*, and 41*h* constituting parts of the bus 41. The outputs of the exclusive OR circuits 40*a* to 40*h* are connected to an AND circuit 112 which has an output lead 114 carrying a compare signal when he exclusive OR circuits 40*a* to 40*h*** are all in condition to provide an output signal.

The AND circuit 88 during a first BCC time phase, to be hereinafter more fully described, causes a bit in the data carry trigger 62 to be applied to the exclusive OR circuit 92 and also provides a feedback signal in line 98 which is applied as an input to the exclusive OR circuit 110 to provide a so-called BCC carry bit. The exclusive OR 92 in effect duplicates the function provided by the exclusive OR circuit 110 for the purpose of proper timing. The AND circuit 94 has the output of exclusive OR circuit 92 as an input, and during the first BCC phase, the AND circuit 94 provides a feedback signal on lead 96 which is provided as an input to the exclusive OR circuit 108 that exclusively ORs the output of the AND circuit 94 with bit position 2 of the data buffers 28, 30, 32, 34, 42, 44, 46, and 48.

The AND circuit 100 has as its inputs the timing signal "minus second BCC phase," a time phase to be more specifically described hereinafter, and the output of the BCC carry trigger 64 and functions to provide a feedback signal in the lead 104 which in turn drives the exclusive OR circuit 106. The exclusive OR circuit 106 has as its inputs, in addition to the feedback signal on lead 104, the contents of bit position 7 of the data buffers 28, 30, 32, 34, 42, 44, 46, and 48 and generates an output into OR block 39.

During a compare phase, which is a time phase mutually exclusive of the first BCC phase as will be hereinafter more fully pointed out, the compare logic 40 is in effect interrogated by the AND circuit 112; and, if the contents of bus 26 and bus 41 are at that time similar, a compare condition will be detected. As will be hereinafter more fully described, the specific comparing during the compare phase may be the first BCC generated character in the adapter with the first BCC received character or may be the second BCC generated character compared with the second BCC received character, or there may be an address compare.

The OR circuitry 39 comprises the OR circuits **39*a*, 39*b*, 39*c*, 39*d*, 39*e*, 39*f*, 39*g*, and 39*h*. The OR circuits 39*a*, 39*b*, 39*c*, 39*d*, 39*e*, 39*f*, 39*g*, and 39*h* respectively have inputs from the bits in positions 1, 2, 3, 4, 5, 6, 7, and 8 of the buffers 28 to 34 and 42 to 48, with the exclusive OR circuits 110, 108, and 106 being respectively in these connections to the OR circuits 39*a*, 39*b*, and 39*g*. The encode control characters logic 38 is also connected with the OR circuitry 39, and the logic 38 comprises AND circuits 116, 118, 120, and 122 and OR circuits 124 and 126. The logic 38 has inputs as follows "minus encode", "minus clock 3, data phase, bit time 8", "minus encode syn", "minus encode leading pad", and " minus encode trailing pad". The logic 38 has output leads 128, 130, 132, and 134, and the leads 128 to 134 are connected with various ones of the OR circuits 39*a* to 39*h* as shown in FIGS. 2*a*, 2*b*, and 2*c*. The OR circuitry 39 functions to gate the output of the encode control characters logic 38 or of the exclusive OR logic 50 on to the bus 41 connected with the compare circuitry 40 as above described and also connected with the DBI register 52 particularly with the lines 41*a* to 41*h* of bus 41**.

The AND circuitry 59 includes AND circuits **59*a*, 59*b*, 59*c*, 59*d*, 59*e*, 59*f*, 59*g*, and 59*h* which respectively have inputs from the OR circuits 39*a* to 39*h* and have outputs to the triggers 58*a* to 58*h*. Each of the AND circuits 59*a* to 59*h* also has a lead 136 as an input, and a "load shift register" signal on lead 136 causes the broadside loading of a byte of data contained in the OR circuits 39*a* to 39*h* and in the bus 41 into the triggers 58*a* to 58*h* of the shift register 58**.

The buffers 42, 44, 46 and 48 are each formed by a series of cells, a cell for each of the eight bits to be stored in each of the buffers. The first two and last cells for each of the buffers 42, 44, 46 and 48 are illustrated in FIG. 4, the cells 206,207 and 213 being the first two and last cells of a series of eight similar cells; the cells 214, 215 and 221 being the corresponding cells for the buffer 44; the cells 222, 223 and 229 being the corresponding cells for the buffer 46 and the cells 230 230, 231 and 237 being the corresponding cells for the buffer 48.

Figure 4:
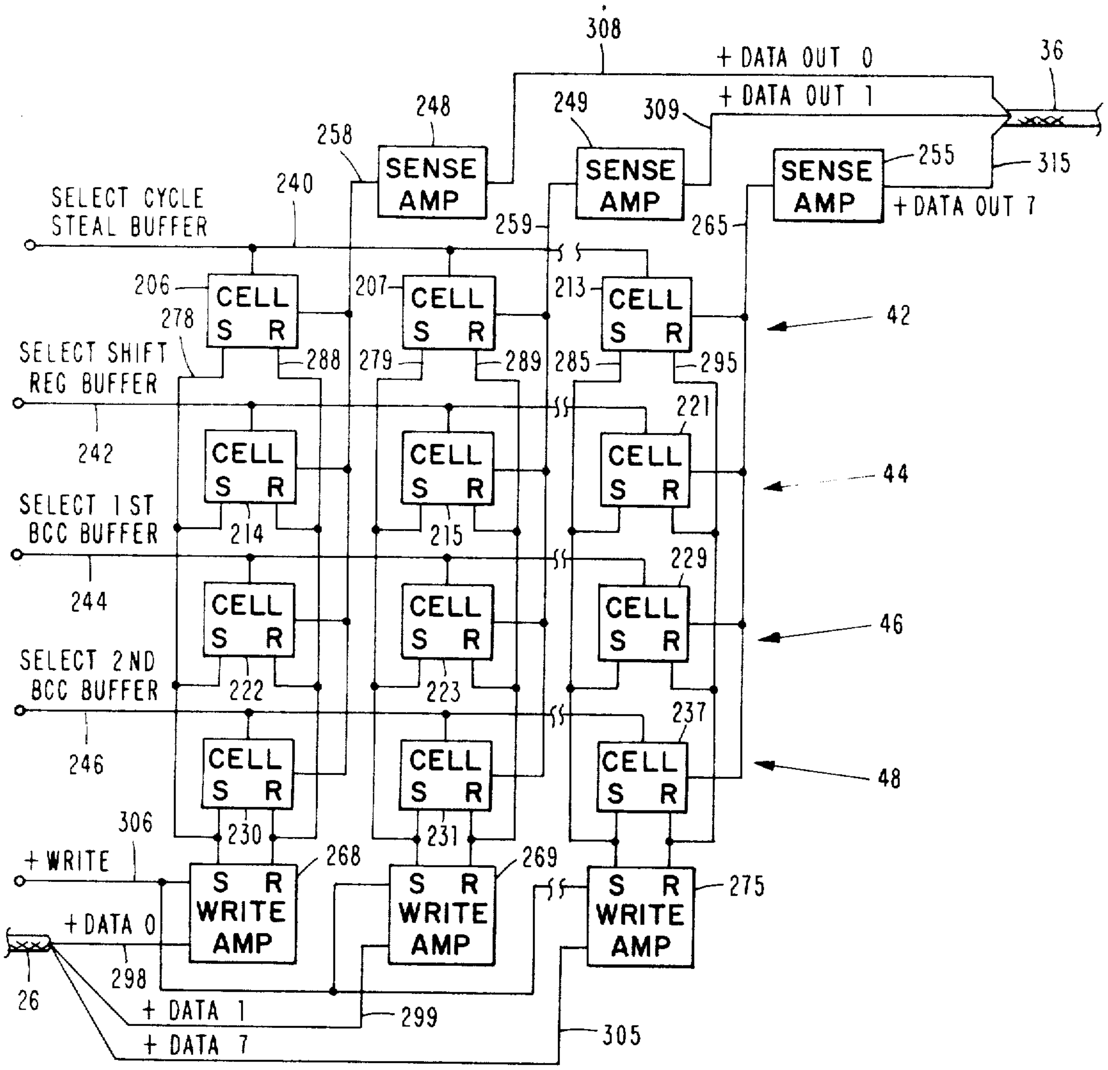
FIG. 4 is a diagrammatic illustration of the first two and last bit positions of a cycle steal buffer, shift register buffer, first BCC buffer and second BCC buffer in the circuitry and including a cell for each bit position.

Referring to FIG. 4, the cells of the cycle steal buffer 42 are controlled by a Select Cycle Steal Buffer signal on a line 240 applied to each of the cells. Similarly, the cells of the shift register buffer 44 are controlled by a Select Shift Register Buffer signal on a lead 242; the cells of the first BCC buffer 46 are controlled by a Select 1st BCC Buffer signal on a line 244; and the cells of the second BCC Buffer 48 are controlled by a Select 2nd BCC Buffer signal on a line 246. The cells 206, 214, 222 and 230 are in the bit zero positions of these buffers 42, 44, 46 and 48, and the outputs of these cells are applied to a sense amplifier 248. Similar sense amplifiers for the other cells are provided, these including the sense amplifiers 249 and 255 illustrated for the bit 1 and bit 7 positions of the buffers. The cells 206, 214, etc. in the bit zero positions of the buffers have an output lead 258 for connecting the cells with the corresponding sense amplifier 248, and the other cells making up the buffers 42, 44, 46 and 48 have corresponding output leads including the output leads 259 and 265 which are illustrated for the one and seven positions of the buffers.

Write amplifiers are provided for each of the positions of the buffers 42, 44 46 and 48, these including the write amplifiers 268, 269 and 275 for the bit zero, bit 1 and bit 7 positions of the buffers that are illustrated. Lines carry set and reset signals from the write amplifiers to the corresponding cells, these including illustrated set signal lines 278, 279 and 285 and leads 288, 289 and 295 carrying reset signals. An input lead is provided for each of the write amplifiers including the illustrated amplifiers 268, 269 and 275, these including the input leads 298, 299 and 305 respectively carrying the data zero, data 1 and data 7 signals. These input lines are connected with a corresponding line in the bus 26 which constitutes the input for the write amplifiers. A lead 306 carrying a controlling "write" signal is connected with the write amplifiers including the illustrated amplifiers 268,269 and 275.

The sense amplifiers each has an output lead, these including the output leads 308, 309 and 315 for the illustrated amplifiers 248, 249 and 255. These leads carry data out zero, data out 1 and additional data out signals; and these leads are connected to corresponding lines in the bus 36 which constitutes the output bus for the buffers 42, 44, 46 and 48.

Figure 5:
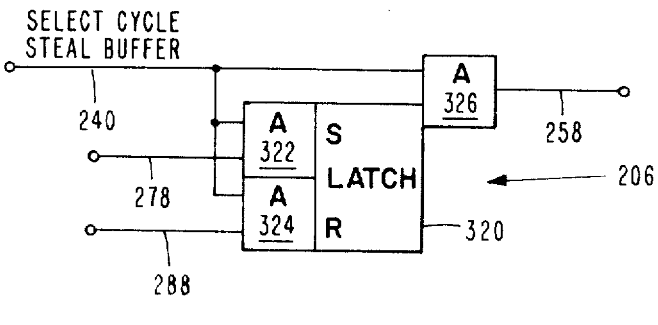
FIG. 5 is a diagrammatic illustration of one of said cells.

The cells 206, 207, 213, 214 and the other cells of the buffers 42, 44, 46 and 48 are identical; and FIG. 5 specifically shows the makeup of cell 206. Referring to this figure, cell 206 may be seen to comprise a latch 320 having an AND circuit 322 appended to it on its set side and an AND circuit 324 appended onto its reset side. An AND circuit 326 is at the output of the latch 320 and is connected to the output line 258. The AND circuits 322 and 324 respectively have the set lead 278 and the reset lead 288 as inputs, and the select cycle steal buffer lead 240 is also applied to both of these AND circuits as an input. The AND circuit 326 has the output of the latch 320 as an input in addition to the select cycle steal buffer lead 240.

The basic function of the buffers 42, 44, 46 and 48 is to receive data, to hold it as data, and to finally discharge this data therefrom, the data being received from bus 26 and discharging into bus 36. If, for example, the cycle steal buffer 42 has data being loaded into it, the write line 306 has a signal on it while bits are present on the corresponding lines of the bus 26, such as the data zero line 298 and the data 1 line 299. In addition, the select cycle steal buffer line 240 has a signal on it. If the particular bit corresponding to a particular cell 206, 207, etc. is present in the bus 26, the corresponding sense amplifier, such as the amplifier 248 or 249, provides an output signal, such as the data out zero or data out 1 signal on the line 308 or 309. Assuming that the zero bit signal exists in the bus 26, the write amplifier 268 will output a corresponding set signal on line 278, and the AND circuit 322 will be satisfied, setting the latch 320. The AND circuit 326 will thus be satisfied so as to provide the data out zero signal on lines 258 and 308. Likewise, signals will appear on the other output lines 309 and 315, for example, if the corresponding signals exist on the input lines 299 and 305. In the same manner, latches in the other cells for the other buffers, 44, 46 and 48, if set, will provide output signals on the lines 308, 309, etc. The output signals may be sensed so as to read the contents of the corresponding buffers 42, 44, 46 and 48, and this may be done after the data 0, etc., input signals go to zero and the write signal is removed, since the data remains latched.

In transmitting, the CPU first acts to send instructions to the communications adapter shown in FIG.S 1, 2*a*, 2*b*, and 2*c* which is assumed to be acting as a sending station, and after the instructions are received by the communications adapter, it reacts by requesting for data from the CPU. This data is supplied by the CPU through the bus 21 to the adapter, and the adapter functions to send this data over the communication line 70, and the line 70 is connected with a receiving adapter which is similar to that shown in FIG. 1 or may be of a different type but still constructed to properly receive the information that is transmitted over the line 70.

The data from the CPU is taken from the memory core or storage of the CPU 8 bits (1 byte) at a time and is transmitted by the communications adapter over the communication line 70 one bit at a time, data thus being transferred to the communications adapter in parallel, 8 bits at a time; and the data is transmitted from the adapter over the line 70 serially, a single bit at a time. The data thus transmitted over line 70 goes to the communications adapter on the receiving end of the line 70 which may be considered as a slave unit, and the slave unit waits for a complete byte of data and then transfer the complete byte in parallel fashion to the CPU with which the slave unit is connected. The information thus transmitted may be either data or control characters. Eight bits forming one byte of data may represent any predetermined character, depending on the coding, such as for example the letter A, the letter B, the letter C, etc., and in addition such an 8 bits could represent a control character.

The transmission of information from the adapter over the line 70 is under the control of an instruction from the associated CPU, and this instruction is received by the adapter and is acknowledged by it, particularly by the decode logic 23. The adapter then requests information from the CPU to transmit, and the CPU responds with the first byte of data. As this data is being transmitted, the adapter requests another byte of data, and this sequence proceeds until a complete message has been transmitted.

The data transmitted over the bus 21 to the adapter is initially collected, a byte at a time, in the DBO register 20, and a byte of data is transferred through the OR circuitry 24 and over the write bus 26 to the cycle steal buffer 42. The buffer 42 is designated as a "cycle steal buffer" for the reason that the operation of gating data from the CPU, as opposed to instructions or addresses, is called cycle stealing. When the adapter is ready to transmit, it requests a cycle steal, and when the CPU is ready, the CPU grants the cycle steal request, and the data at this time comes from the CPU through the bus 21 to the DBO register 20.

The byte of data is taken from the cycle steal buffer 42 and is moved as a byte to the shift register 58 through the read bus 36, the exclusive OR circuitry 50, the OR circuitry 39 and the AND circuitry 59. The byte of data is transferred all 8 bits at a time to the shift register 58 which receives the byte in parallel, and the shift register 58 is capable of shifting data to the right toward the position 1 end; and every time a shift of the shift register 58 occurs, a bit moves from the 1 position to either trigger 62 or 64. It will be remembered that all of the bits previously moving from the CPU into the adapter have done so in a parallel fashion, 8 bits at a time, but at this time the shift register 58 changes the movement to serial fashion. The bit moving to the data carry trigger 62 moves from thence to the transmit trigger 66 and from thence to the modem 68. The data carry and the transmit triggers 62 and 66 are simply provided for temporarily storing a bit because of timing requirements. The modem 68 may simply be a device which changes the bits moving serially from the transmit trigger 66 into tones which are modulated onto the communication line 70, the line 70 being a conventional telephone line, for example. The different tones may be called marks and spaces, and these tones are transmitted serially on the line 70.

It should be noted that there is no circulation of bits through the shift register 58 from one end to the other, and the main purpose of the register 58 is to serialize the bits which have been transferred in parallel to this point. There is a predetermined delay (of microseconds) in which a byte is in each of the DBO register 20, the cycle steal buffer 42, and the shift register 58.

The functions of the auxiliary buffers 44, 46, and 48 will now be described. As previously mentioned, 8 bits move into the shift register 58, and then subsequently the 8 bits of the byte are shifted to the right by 1 bit position, and the lowest order bit moves to the telephone line 70 as a tone, which may be either a mark or a space. The character may, for example, be the A character which in EBCDIC code is represented by 1100 0001 (hexadecimal C1), and seven-eights of this character remains in the shift register 58 after 1 bit has been moved out of register 58, and this seven-eights of the character is moved in parallel fashion out of the shift register 58 through the bus 60 and OR circuitry 24 into the shift register buffer 44. This shifting of the remaining portion of the first character to be transmitted over the line 70 into the shift register buffer 44 as well as the previous transfer of the complete character from the cycle steal buffer 42 to the shift register 58 and a shifting of the bits in the register 58 one position to the right all occurred within a time period which may be termed a first "data phase" during which data is transferred.

Figure 3:
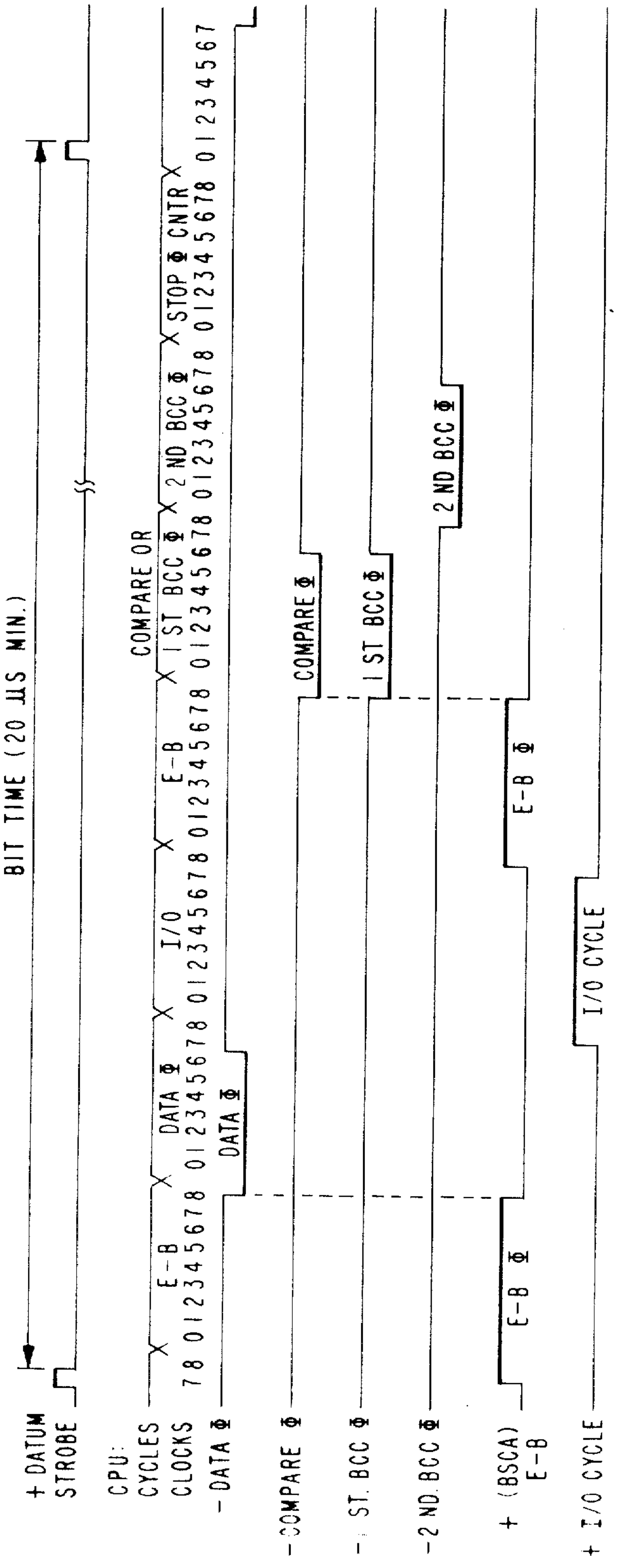
FIG. 3 is a timing diagram showing the relative timing of various operations and time periods of the adapter and its associated CPU.

Referring to the FIG. 3 timing diagram, it will be observed that the data phase occurs once for each bit time which may, for example, be 20 microseconds and is synchronized with a clock in the modem 68 that determines when the marks and spaces may be transmitted on to the line 70; and the data phase, as well as other timing of the adapter, is synchronized also with the timing with which the associated CPU is operated. The data phase is a CPU machine cycle not used by the adapter for either an E–B or an I/O cycle. The E–B cycle and the I/O cycle are for transferring information from a CPU to an attachment for a peripheral device or vice versa. Following the data phase machine cycle, as will be apparent from FIG. 3, two additional machine cycles are required for generation of two BCC bytes, and these are called first BCC phase and second BCC phase. The BCC phases occur in succession during the unused machine cycles following the data phase machine cycle.

During the following data phase in the next bit time, the contents of the shift register buffer 44, which is seven-eights of the first or the A character in the specific example mentioned, is transferred back into the shift register 58 through the read bus 36, the exclusive OR circuitry 39, and the AND circuitry 59, and another shift to the right of the bits in the shift register 58 occurs so that the second bit of this letter A is then transferred to the triggers 62 and 66 and to the modem 68 which produces a corresponding mark or space on line 70. Six-eighths or three-fourths of the first character or letter A is then left in the shift register 58, and this similarly as with the previous portion of the first character transmitted moves in parallel fashion through the bus 60 and into the shift register buffer 44. After a brief wait, this remaining portion (three-fourths) of the letter A or first character is transferred to the shift register 58 which then has 6 bits to work with. One of these bits is transferred out of register 58 serially, and the 5 remaining bits are moved in parallel fashion to the shift register buffer 44 through bus 60, and this all occurs during the data phase in the third bit time. During the fourth, fifth, sixth, seventh, and eighth following bit times, the fourth, fifth, sixth, seventh, and eighth bits are moved to the communication line 70, and at the end of the eighth bit time, the shift register 58 includes all zeroes, and these are transferred to the shift register buffer 44 which then includes all zeroes. The first character (the letter A) has then been completely transmitted over the line 70.

While the first byte or character is being shifted through and out of the adapter, another cycle steal request is made by the adapter of the CPU for further data. The CPU grants the cycle steal request; and the next character, such as the letter B, comes in parallel bit form through the data bus OUT 21 and is stored in the DBO register 20 for a short period of time and then moves to the cycle steal buffer 42 through buses 22 and 26 and OR circuitry 24. The letter B in EBCDIC code, incidentally, is represented by the bits 1100 0010, which is C2 in hexadecimal. This second character transfers from the cycle steal buffer 42 to the shift register 58 once the first character has been completely transmitted to the line 70 and is shifted one position to the right so that its lowest bit is transmitted as a mark or a space on communication line 70 as was described above in connection with the first bit of the letter A. The full transmission of the second character or the letter B is accomplished in identically the same manner as the first character or the letter A, utilizing 8 successive data phases and bit times, and successive characters derived from the CPU are transmitted over the line 70 identically.

The basic reason for the continuing transfer from the shift register 58 to the shift register buffer 44 with decreasing proportions of the character to be transmitted is for the generation of a BCC check character. This generation is done particularly by the shift register 58 acting in conjunction with the first BCC buffer 46 and the second BCC buffer 48, and the buffers 46 and 48 are basically provided for generating first BCC and second BCC bytes as a result of all of the data that was sent in a particular message. These bytes of data are sent over the line 70 to the slave adapter which also generates the same bytes in the same manner; and if the BCC bytes of data sent match with those which the slave adapter generates, the message is proved to have been correctly sent. There is a possibility that random noise on the line 70 may occur and may disturb the transmission from the sending adapter to the slave adapter causing the latter to receive the wrong information, and this generation of first BCC and second BCC bytes and the comparison assures that the data received at the slave adapter is the same as that which has been transferred by the sending adapter.

There are 8 bit times for each character transmitted corresponding to the 8 bits in the character, and each of these bit times contains a data phase (see FIG. 3), and during the data phase, a new bit is shifted from the shift register 58, bit position 1, into the data carry trigger 62 which serves to provide input data for the BCC accumulation. BCC accumulation occurs in the buffers 46 and 48 during the first and second BCC phases following the data phase for each bit time. During the first BCC phase, the contents of the first BCC buffer 46 is loaded into the shift register 58 at clock 3. For bit time 1, the contents of the first BCC buffer 46 is eight 0's. Exclusive OR circuit 110 has inputs from bit position 1 of the first BCC buffer 46 and the feedback lead 98, and the output of the exclusive OR circuit 110 is loaded into bit position 1 of the shift register 58 through the OR circuit **39*a* and the AND circuit 59*a*. The output of bit position 1 of register 58 becomes the feedback signal on lead 96 by means of the AND circuit 88, the exclusive OR circuit 92 and the AND circuit 94, and this feedback signal along with the contents of bit position 2 in the first BCC buffer 46 are the inputs of the second exclusive OR 108. The contents of exclusive OR circuit 108 is loaded into bit position 2 of the shift register 58 by means of the OR circuit 39*b* and AND circuit 59*b*. Bit positions 3 – 8 of the shift register 58 are loaded with the contents of bit positions 3 – 8 of the first BCC buffer by means of the OR circuitry 39 and AND circuitry 59, and at clock 4 during the first BCC phase, the shift register 58 has its contents shifted 1 position to the right whereby the previous content of the BCC carry trigger 64 enters bit position 8 of the shift register 58 through lead 80 and OR circuit 77. At this time, the contents of bit position 1 of shift register 58 enter the BCC carry trigger 64, and the contents of the shift register 58 is stored in the first BCC buffer at clock 5** of the first BCC phase.

During the following second BCC phase in each bit time, the contents of the second BCC buffer 48 is loaded into the shift register 58 at clock 3 time. For the first bit time of the first character, these contents would be all zeroes. The inputs of the exclusive OR circuit 106, which is that exclusive OR effective during the second BCC phase, are the contents of bit position 7 of the second BCC buffer 48 and the feedback signal on lead 104 which is the output at the second BCC phase from the BCC carry trigger 64. The output of exclusive OR circuit 106 is loaded into the shift register bit position 7 by means of the OR circuit **39*g* and the AND circuit 59*g*. The contents of bit positions 8 and 1 – 6 of the second BCC buffer 48 are loaded into the bit positions 8 and 1 – 6 respectively of the shift register 58 at the same time by the OR circuitry 39 and AND circuitry 59. At clock 4 of the second BCC phase, the contents of the shift register 58 are shifted 1 position to the right, and on this shift, the content of the BCC carry trigger 64 enters bit position 8 of the shift register 58 by means of the lead 80 and OR circuit 77. At clock 5 of the second BCC phase, the contents of shift register 58 is stored into the second BCC buffer 48. At clock 6 of the second BCC phase, the contents of bit position 1 of the shift register 58 is stored into the BCC carry trigger 64 and this bit is shifted into bit position 8 of the shift register 58 during the next first BCC phase by means of the lead 80 and OR circuit 77. This shifting functions to connect the byte produced in the second BCC buffer 48 to the byte previously produced in the first BCC buffer 46. This operation continues for each of the others of the 8 bits in each character for each of the 8 bit times, and also continues in the same manner for each new character each of which requires 8 bit times to transmit, and results in a unique association of bits in both of the buffers 46 and 48 by the time the message has been completely transmitted. The contents of the first BCC buffer 46 are loaded into the shift register 58 during clock 3 of the data phase in a bit time 8 subsequent to the sending of the previous part of the message, and these contents of the shift register 58 are then transmitted similarly to a normal byte of data on to the line 70. Then during the next bit time 8, the contents of the second BCC buffer 48 are loaded into the shift register 58 and transmitted over the line 70** in the same manner.

During the formation of the first BCC check character and the second BCC check character, which together constitute a check character that is 16 bits in length, the values at the various bit positions in the first BCC buffer 46, the second BCC buffer 48, and shift register 58 are as set forth in the following table:

| Bit | 1st BCC Buffer 46 87654321 | BCC Ø | Shift Reg. 58 87654321 | Function | | CPU Clk | BCC Carry Tgr. | Data Carry Tgr. | 2nd BCC Buffer 48 87654321 |
|---|---|---|---|---|---|---|---|---|---|
| 8 | 00000000 | 1st | 00000000 | RESET | | Ø | 0 | | |
| | | | 00000011 | LOAD | 58 | 3 | | | |
| | | | 00000001 | SHIFT | 58 | 4 | | | |
| | 00000001 | | ← | STORE | 58 | 5 | 1 | 1 | |
| | | 2nd | 00000000 | RESET | 58 | Ø | | | 00000000 |
| | | | 01000000 | LOAD | 58 | 3 | | | |
| | | | 10100000 | SHIFT | 58 | 4 | | | |
| | | | → | STORE | 58 | 5 | 0 | | 10100000 |
| 1 | 00000001 | 1st | 00000000 | RESET | 58 | Ø | | | |
| | | | 00000011 | LOAD | 58 | 3 | | | |
| | | | 00000001 | SHIFT | 58 | 4 | | | |
| | 00000001 | | ← | STORE | 58 | 5 | 1 | 0 | |
| | | 2nd | 00000000 | RESET | 58 | Ø | | | 10100000 |
| | | | 11100000 | LOAD | 58 | 3 | | | |
| | | | 11110000 | SHIFT | 58 | 4 | | | |
| | | | → | STORE | 58 | 5 | 0 | | 11110000 |
| 2 | 00000001 | 1st | 00000000 | RESET | 58 | Ø | | | |
| | | | 00000011 | LOAD | 58 | 3 | | | |
| | | | 00000001 | SHIFT | 58 | 4 | | | |
| | 00000001 | | ← | STORE | 58 | 5 | 1 | 0 | |
| | | 2nd | 00000000 | RESET | 58 | Ø | | | 11110000 |
| | | | 10110000 | LOAD | 58 | 3 | | | |
| | | | 11011000 | SHIFT | 58 | 4 | | | |
| | | | → | STORE | 58 | 5 | 0 | | 11011000 |
| 3 | 00000001 | 1st | 00000000 | RESET | 58 | Ø | | | |
| | | | 00000011 | LOAD | 58 | 3 | | | |
| | | | 00000001 | SHIFT | 58 | 4 | | | |
| | 00000001 | | ← | STORE | 58 | 5 | 1 | 0 | |
| | | 2nd | 00000000 | RESET | 58 | Ø | | | 11011000 |
| | | | 10011000 | LOAD | 58 | 3 | | | |
| | | | 11001100 | SHIFT | 58 | 4 | | | |
| | | | → | STORE | 58 | 5 | 0 | | 11001100 |
| 4 | 00000001 | 1st | 00000000 | RESET | 58 | Ø | | | |
| | | | 00000011 | LOAD | 58 | 3 | | | |
| | | | 00000001 | SHIFT | 58 | 4 | | | |
| | 00000001 | | ← | STORE | 58 | 5 | 1 | 0 | |
| | | 2nd | 00000000 | RESET | 58 | Ø | | | 11001100 |
| | | | 10001100 | LOAD | 58 | 3 | | | |
| | | | 11000110 | SHIFT | 58 | 4 | | | |
| | | | → | STORE | 58 | 5 | 0 | | 11000110 |
| 5 | 00000001 | 1st | 00000000 | RESET | 58 | Ø | | | |
| | | | 00000011 | LOAD | 58 | 3 | | | |
| | | | 00000001 | SHIFT | 58 | 4 | | | |
| | 00000001 | | ← | STORE | 58 | 5 | 1 | 0 | |
| | | 2nd | 00000000 | RESET | 58 | Ø | | | 11000110 |
| | | | 10000110 | LOAD | 58 | 3 | | | |
| | | | 11000011 | SHIFT | 58 | 4 | | | |
| | | | → | STORE | 58 | 5 | 1 | | 11000011 |
| 6 | 00000001 | 1st | 00000000 | RESET | 58 | Ø | | | |
| | | | 00000000 | LOAD | 58 | 3 | | | |
| | | | 10000000 | SHIFT | 58 | 4 | | | |
| | 10000000 | | ← | STORE | 58 | 5 | 0 | 1 | |
| | | 2nd | 00000000 | RESET | 58 | Ø | | | 11000011 |
| | | | 11000011 | LOAD | 58 | 3 | | | |
| | | | 01100001 | SHIFT | 58 | 4 | | | |
| | | | → | STORE | 58 | 5 | 1 | | 01100001 |
| 7 | 10000000 | 1st | 00000000 | RESET | 58 | Ø | | | |
| | | | 10000011 | LOAD | 59 | 3 | | | |
| | | | 11000001 | SHIFT | 58 | 4 | | | |
| | 11000001 | | ← | STORE | 58 | 5 | 1 | 1 | |
| | | 2nd | 00000000 | RESET | 58 | Ø | | | 01100001 |
| | | | 00100001 | LOAD | 58 | 3 | | | |
| | | | 10010000 | SHIFT | 58 | 4 | | | |
| | | | → | STORE | 58 | 5 | 0 | | 10010000 |

The above table illustrates the change in the contents of the first and second BCC buffers 46 and 48 while the letter A in EBCDIC, which is 1100 0001, (C1 in hexadecimal) is being transmitted. During bit time 8, the first bit of the letter A is sent to the data carry trigger 62 during data phase. This first bit is a 1 as is shown in the table under "Data Carry Tgr." during bit time 8. Initially, the first BCC buffer contains all zeroes, and the contents of the BCC carry trigger 64 is 0. Within bit time 8 during the first BCC phase, the shift register 58 is reset at clock 0 to contain all zeroes. At clock 3 during bit time 8, the contents of 1st BCC buffer 46 is loaded into shift register 58 via the exclusive OR circuitry 50, the OR circuitry 39, and the AND circuitry 59. During the loading, the exclusive OR circuits 108 and 110 are operative to affect bits 1 and 2, and in particular to change them from zeroes to ones. These exclusive ORs are so effective because the contents of the data carry trigger 62 is a 1; the contents of BCC carry trigger 64 is a 0; and bit positions 1 and 2 of the BCC buffer 46 are both 0's. At clock 4 during bit time 8, the bits in the shift register 58 are shifted to the right by 1 position so that the shift register 58 contains all zeroes, except for the 1 in bit position 1. The 1 that has been shifted out of shift register 58 now appears as a 1 in the BCC carry trigger 62, and the previous contents of the BCC carry trigger 62, a 0, now appears as bit position 8 of the shift register 58. At clock 5 during bit time 8, the contents of the shift register 58 is stored into BCC buffer 46. This completes the first BCC phase during bit time 8.

Initially, the second BCC buffer 48 contains all zeroes and the BCC carry trigger contains a 1 as shown in the table at bit time 8 for the second BCC phase. At clock 0 during bit time 8 of the second BCC phase, shift register 58 is reset to all zeroes, and at clock 3 the contents of the second BCC buffer 48 is loaded into the shift register 58 through the exclusive OR circuitry 50, the OR circuitry 39, and the AND circuitry 59. During this loading, the exclusive OR circuit 106 is effective to change the contents of bit position 7 from a 0 to a 1. The exclusive OR circuit 106 is under the influence of the 1 in the BCC carry trigger 62 and the 0 in position 7 of the second BCC buffer 48 for this purpose. At clock 4, the contents of the shift register 58 is shifted 1 position to the right so that a 0 is transferred to the BCC carry trigger 64, and the previous contents of a 1 in the BCC carry trigger 64 is transferred to bit position 8 of the shift register 58. At clock 5, the contents of the shift register 58 is loaded into the second BCC buffer 48 without change. This ends the second BCC phase.

During the following bit times 1 – 7, the process just described is repeated but using new data carry bits, these being the makeup of the character A that is being transmitted. At the end of bit time 7, the entire character A has been transmitted and accumulates in the first and second BCC buffers 46 and 48. Any succeeding characters will begin their BCC accumulation during the next bit time 8 but beginning with the new contents of the BCC buffers 46 and 48 that remain at the end of bit time 7 just described.

As above described, the exclusive OR circuit 110 influences the contents of trigger **58*a*; the exclusive OR circuit 108 influences the contents of trigger 58*b*; and, the exclusive OR circuit 106 influences the contents of trigger 58*g*. The inputs to the exclusive OR circuit 110 are the contents of bit position 1 of the first BCC buffer 46 through lead 36*a* and the contents of the data carry trigger 62 on its output lead 84 transmitted through AND circuit 88 and lead 98. The exclusive OR circuit 108 is controlled by the contents of bit position 1 of the first BCC buffer 46, the contents of data carry trigger 62, and the contents of bit position 2 of the first BCC buffer 46. Lead 36*b* in particular provides the contents of bit position 2 of buffer 46 to the exclusive OR circuit 108. The exclusive OR circuit 92 has the output of data carry trigger 62 applied to it through AND circuit 88 and lead 91 and has the contents of bit position 1 of buffer 46 applied to it through lead 36*a* so that the output of exclusive OR circuit 92 is the combination of these two signals, and the output of exclusive OR circuit 92 is applied to the exclusive OR circuit 108 through AND circuit 94 and lead 96. The exclusive OR circuit 106 has two inputs, one from he seventh position of the second BCC buffer 48 through lead 36*g* and the other from the BCC carry trigger 64 through the output lead 80 of the trigger 64, the AND circuit 100 and lead 104**.

In order that the relationship between the inputs and outputs of the exclusive OR's 106, 108, and 110 may be clearly understood, the following truth tables are set forth with respect to exclusive OR circuits 106, 108, and 110 respectively:

| Ex OR 106 | | | Ex OR 108 | | | | Ex OR 110 | | |
|---|---|---|---|---|---|---|---|---|---|
| 80 | 36g | 58g | 36b | 84 | 36a | 58b | 84 | 36a | 58a |
| −1 | +1 | 1 | +1 | −1 | +1 | 1 | −1 | +1 | 0 |
| −1 | −0 | 0 | +1 | −1 | −0 | 4 | −1 | | |
| −0 | | | | | | | | | 1 |
| +0 | +!1 | 0 | +1 | +0 | +1 | 0 | +0 | +1 | 1 |
| +0 | −0 | 1 | +1 | +0 | −0 | 1 | +0 | | |
| −0 | | | | | | | | | 0 |
| | | | −0 | −1 | +1 | 0 | | | |
| | | | −0 | −1 | −0 | 1 | | | |
| | | | −0 | +0 | +1 | 1 | | | |
| | | | −0 | +0 | −0 | 0 | | | |

In order that the communications adapter may be properly operated, the programmer of the system has certain obligations. First of all he must indicate a start point in the memory or core of the CPU for the message to be transmitted from the sending communications adapter to the slave communications adapter, and the programmer indicates this by an STX (start of text) character in the CPU memory which is located just ahead of the first byte of data to be transmitted. The STX character in EBCDIC code may be 0000 0010 which in hexadecimal is 0 2. The programmer also must indicate the end of the text, and this is done with an ETX (end of text) character in the CPU memory. Assuming that the message to be transmitted is A, B, C, the complete message in core would therefore be STX, A, B, C, ETX.

In addition to the framing characters, ETX and STX, the communications adapter also contributes a few characters of its own which are provided by the encode control characters logic 38. The first character that the master communications adapter transmits, before asking for any information from the CPU memory, including the STX character, is a hex 55 leading pad character which is an alternating pattern of ones and zeroes and then the communications adapter transmits two syn characters also generated from the encode control characters logic 38, each of which may be 0011 0010 which is hexadecimal 3 2. These characters are transmitted by the communications adapter by shifting them into the shift register 58 and sending bits from them one at a time serially, using the shift register buffer 44, in the same manner as data is transmitted as above described. The hex 55 character is utilized by the receiving modem for locking into bit phase and the syn characters are used by the slave communications adapter for locking into character phase, in particular, for determining where bit 1 is located with respect to bit 8 so that the slave communications adapter is able to determine the divisions between characters. After the transmission of the hex 55 and syn characters, the communications adapter send the message which includes the STX character followed by the characters A, B, and C, assuming that the latter three characters constitute the message, and then followed by the ETX character. After this message has been transmitted by the master communications adapter, the BCC-hi and BCC-lo characters are sent as previously described, and then eight 1's in a row (hexadecimal FF) are transmitted, these being called trailing pad characters; and all of these characters are transmitted in the same manner as are the data characters. The encode control characters logic 38 also provides the trailing pad characters. The same message from the CPU memory associated with the master communications adapter is put into the memory of the slave communications adapter and the characters added by the adapter at the sending end, particularly by its encode control characters logic 38, are stripped away by the communications adapter at the receiving end.

The portion of the encode control characters logic 38 for providing the syn, the hex 55 and the hex FF characters is shown in FIGS. 2*a*, 2*b*, and 2*c*. It will be noted that the inputs to the AND circuit 116 are satisfied when an encode and a clock signal are supplied thereto, and the AND circuits 118, 120, and 122 have their inputs satisfied when a syn, a leading pad (hex 55), and a trailing pad (hex FF) signals are respectively applied thereto as inputs. The outputs of the circuits 116, 124, and 126 are connected with various parts of the OR logic 39, and the result is that the syn, leading pad, and trailing pad characters are provided for the shift register 58 at the proper time, and these characters are shifted out of the register 58 in the same manner as are the other characters.

Before transmission of a message is begun, the program for the sending communications adapter performs three operations. First the program loads into a buffer in the CPU at the sending adapter a current address, this being the start of the field that is to be transmitted and actually the current address points to the location in the CPU memory at which the STX character is located. Secondly, the program loads a transition address into the transition-lo buffer 32 and transition-hi buffer 34 (through DBO 21, OR circuitry 24 and bus 26) and this is a 16 bit address with the 8 lower bits being located in the transition-lo buffer 32 and the 8 higher bits being located in the transition-hi buffer 34. This 16 bit address constitutes the address in the CPU memory at the sending adapter of the ending character of the message plus 1 and indicates that when this address is used, transmission should cease. The programmer also, before transmission is begun, loads a stop address into the stop-lo buffer 28 and into the stop-hi buffer 30, and the stop address, like the transition address, is a 16 bit address with the lower 8 bits being in the stop-lo buffer 28 and the higher 8 bits being in the stop-hi buffer 30. The stop address in the buffers 28 and 30 points to the last position in the CPU memory at the sending end, plus 1, into which the communications adapter may store information while receiving.

Every time a cycle steal request is granted, data is either fetched from the CPU memory or is stored therein; and at this time, the current address is also obtained, this current address indicating to which particular position in the CPU memory the communications adapter is connected at that time; and the current address initially is at the STX character in the memory of the CPU at the sending end. Beginning with the first fetch cycle steal request, obtaining a character from he memory of the CPU at the sending adapter, the current address increments by 1, starting at the STX character, and additional cycle steal requests on being granted increments the current address by additional increments of 1. When the current address is the same as the transition address, a change is made by the adapter from a transmit condition to a receive condition; and when the current address is equal to the stop address, receiving is terminated.

The current address is stored in a local store register in the CPU, and the low byte (bits 0 – 7) of the current address is transferred through the bus 21, the DBO register 20, bus 22, the OR circuitry 24 and the bus 26 directly to the exclusive OR circuits 40*a* to 40*h* of the circuitry 40. At the same time, the 8 bits in the stop-lo buffer 28 are transferred through the LSR read bus 36, exclusive OR 50, OR circuitry 39, and bus 41 to the exclusive OR circuits in the circuitry 40. In this case, the exclusive OR circuits 106, 108, and 110 are set for simply flushing the respective bits through these exclusive OR circuits. If there is a compare, all of the exclusive OR circuits 40*a* to 40*h* present a negative signal at this time to the AND circuit 12, with the result that a compare signal appears on lead 114. This compare operation actually takes place during the I/O cycle phase shown on FIG. 3.

The higher 8 bits of the address are then transferred from the CPU to the exclusive OR circuitry 40 in the same manner as the lower 8 bits as just described, namely, through the bus 21, the DBO register 20, the bus 22, the OR circuitry 24, and the bus 26. The 8 bits in the stop-hi buffer are then transferred through the read bus 36, the exclusive OR circuitry 50, the OR circuitry 39, and the bus 41 to the compare logic 40, and at this time these higher bytes are compared; and, if a compare exists, a corresponding signal is provided on the lead 114.

A comparison of the contents of the transition-lo buffer 32 and the transition-hi buffer 34 with the current address is made in the same manner as just described.

When the communications adapter shown in FIG. 1 is used in its receive mode, constituting a slave adapter connected with its own CPU, the modem 74 acts as a demodulator and changes mark and space tones on communication line 72 to mark and space signals applied to the receive trigger 76. The trigger 76 is of the same construction as the trigger 66 and the serial data from the line 72 is shifted into the high order end of the shift register 58, the bits entering the shift register in serial fashion. Receiving by the slave adapter is initially during the first data phase, and at this time there is a transfer in parallel of the bits in the shift register buffer 44 to the shift register 58, the transfer being through the exclusive OR circuitry 50, the OR circuitry 39, and the AND circuitry 59. The shift register buffer 44 at this time contains all zeroes, and therefore the transfer is of all zeroes. The bits in the shift register 58 are then all shifted to the right by 1 position, and in doing this, the contents of the receive trigger 76 is shifted into the eighth position of the shift register 58. If the first character received is an A for example, there would thus be the first bit of the A character in the eighth position of the shift register 58. The A character in EBCDIC code is 1100 0001 (which is hexadecimal C 1) and therefore the 1 on the extreme right of the above series of bits, which is the EBCDIC bit 7, is now in position 8 of the shift register 58. The data now in the shift register 58, which is all zeroes except for the 1 bit in position 8, is at this time stored in parallel fashion through the bus 60, the OR circuitry 24, and the bus 26 into the shift register buffer 44.

During the data phase for the second bit time, the contents of the shift register 44 are loaded through the exclusive OR circuitry 50, the OR circuitry 39, and the AND circuitry 59 into the shift register 58, and the contents of the shift register 58 are shifted 1 position to the right so that EBCDIC bit 6 (a zero) of the character A, resident in the receive trigger 76, is shifted into the eighth position of the shift register 58, moving the original 1 of the character A into the seventh position of the shift register 58. The data now in the shift register 58, which is all zeroes except for the 1 bit in position 7, is at this time stored in parallel fashion through the bus 60, the OR circuitry 24, and the bus 26 into the shift register buffer 44. The remaining bits of the character A are transferred into the shift register 58 in the same manner, with a storing in parallel of the contents of the shift register 58 to the hift register buffer 44 being made prior to each shift of bits to the right in the shift register 58. The first BCC accumulation in buffer 46 and the second BCC accumulation in buffer 48 are made during the first and second BCC phases as shown in FIG. 3 in the same manner as was accomplished in the transit mode, beginning after each character has been fully received.

After the full 8 bits are in the shift register 58, the character is stored into the cycle steal buffer 42, instead of the shift register buffer 44, and at this time a cycle steal request is made. This happens during bit time 7 while receiving. When the request is granted by the CPU connected with the receiving adapter, the contents of the cycle steal buffer 42 are transferred to the DBI register 52 through the exclusive OR circuitry 50, the OR circuitry 39, and the bus 41. The DBI register 52 buffers the byte for a brief period and from thence the byte is transferred from the data bus IN 54 into the memory or core of the CPU with which the receiving adapter is connected, and the data is thus stored in core. The succeeding characters are stored in core in the same manner.

After each of the bit times and particularly after each data phase in which a new bit is received, the contents of the first BCC buffer 46 and the second BCC buffer 48 of the slave adapter should be the same as the contents of the buffers 46 and 48 in the sending adapter; however, delayed by one byte time. When the message has been completely transmitted, as above described, the sending adapter then sends its first BCC character, and this is sent serially in the same manner as the characters of the message. The first BCC character is accumulated in the shift register 58 in the receiving adapter in the same manner as is each of the characters of the message, with the contents of the shift register buffer 44 first being transferred to the shifted register 58 and then subsequently a bit from the receive character 76 is moved into the 8 position of the shift register. After all 8 bits of the first BCC character have thus been received into the shift register 58, the compare circuitry 40 functions to compare the first BCC character in the slave station contained in the first BCC buffer 46 with the first BCC character which has just been received from the master station and is now stored in shift register buffer 44. At this time, the contents of the first BCC buffer 46 in the slave adapter are gated through the exclusive OR circuitry 50, OR circuitry 39 and bus 41 to the compare circuitry 40 while the contents of the shift register buffer 44 (the first BCC character received from the master station) is transferred through the bus 60, the OR circuitry 24, and the bus 26 to the compare circuitry 40. The compare circuitry 40 then indicates whether or not the first BCC characters generated respectively in the master and slave adapters are the same; and if so, the second BCC character should be compared. The second BCC character from the master station is received into the shift register 58 a bit at a time in the same manner as the first BCC character from the master station is received into the shift register 58, and then subsequently a compare of the master station's second BCC character in the shift register buffer 44 is made with the second BCC character in the buffer 48 of the slave adapter, utilizing the compare circuitry 40 as just described. If the second BCC character, as well as the first BCC character compares, the transmission has been verified. On the other hand, if either the first BCC character or the second BCC character did not compare, an error of transmission is indicated, and the message must be retransmitted.

In summary, the individual parts of the adapter act as follows: The shift register 58 during transmit operations shifts data bits serially to the data carry trigger 62 so that the data byte is serially transmitted, and the shift register 58, used along with the BCC buffers 46 and 48 and the exclusive OR circuitry 50 generates new first and second BCC characters for each bit shifted into the data carry trigger 62. The first and second BCC characters if considered together may be considered the equivalent of a 16 bit BCC character. The generation of new first and second BCC characters is substantially the same for receiving as for transmitting operations however is delayed by one byte time. The compare circuitry 40 not only compares stop and transition addresses with current addresses in the associated CPU but also compares a received BCC character with a generated BCC character, when the adapter is being used in its receive mode so as to check the accuracy of the transmission. The shift register buffer 44 acts to store the shift register data after each shift of the register 58 during transmit and receive data phases, and therefore the shift register 58 may also be used during the compare phase or first and second BCC phases.

The compare logic 40 is also time multiplexed for multiple usage. The logic 40 is only 8 bits wide even though both the transition address and the stop address are 16 bits long, and these two addresses are compared by using the two buffers 28 and 30 together for the stop address and the two buffers 32 and 34 together for the transition address. The shift register 58 is only 8 bits long but nevertheless provides a BCC check character effectively 16 bits long, one half of which is contained in the first BCC buffer 46 and the second half of which is contained in the second BCC buffer 48. The compare logic 40 although only being 8 bits wide functions with respect to this 16 bit BCC check character to compare all of it with a similar character received from a master unit due to the time multiplexing of the compare circuitry with respect to the first and second BCC buffers 46 and 48. The time multiplexed shift register 58, being used for data transmission, data reception, BCC generation, and address or character comparing simplifies the attendant logic required; and the shift register 58, while being only 8 bits long, nevertheless in conjunction with the other logic and in particular in conjunction with the exclusive OR circuits 106, 108, and 110 which respectively have outputs from the seventh bit position of the second BCC buffer 48 and the second and first bit positions of the first BCC buffer 46, provides the same CRC–16 mode of BCC generation and checking as has been provided conventionally prior hereto but with full length, 16 bits wide, BCC buffers.

What is claimed is:

1. A communications adapter for sending and/or receiving information in the form of a plurality of bits and generating multi-bit check characters with such sending or receiving, comprising:

a shift register into and from which bits are serially shifted one at a time from loading and unloading ends of the register and into which and from which a plurality of bits are loaded and unloaded in parallel from loading and unloading sides of the register, first and second check character buffers each of which includes a plurality of bit positions, a data carry storage device holding the bits of said information that is sent or received, a check character carry storage device holding individual bits serially shifted out of said shift register, a first multi-line buffer-register path connecting said first check character buffer with said shift register for loading the bits contained in this buffer in parallel into said shift register, a first bit changing circuitry in one line of said path to have an input thereby from said first check character buffer and having a second input from said data carry storage device to have a bit therein applied to the bit changing circuitry so that the bit changing circuitry has a bit output for a combination of bits on its said inputs and applied through said line onto said shift register, a serial bit path connecting said unloading end of said shift register with said check character carry storage device and from thence extending to said loading end of said shift register so that a bit at said unloading end of the shift register may be serially shifted into said check character carry storage device so that a bit then in said check character carry storage device is serially shifted to the loading end of said shift register, a first multi-line register-buffer path connecting said shift register with said first check character buffer for unloading the bits in said shift register into said first character buffer in parallel after said serial shifting of the bits in said shift register has occurred, a second multi-line buffer-register path connecting said second character buffer with said shift register for loading the bits contained in this buffer in parallel into said shift register, a second bit changing circuitry in one line of said second buffer-register path to have an input thereby from said second check character buffer and having a second input from said check character carry storage device to have a bit therein applied to this bit changing circuitry so that this bit changing circuitry has a bit output for a combination of bits on its said inputs and applied through this line to said shift register, and a second multi-line register-buffer path connecting said shift register with said second check character buffer for unloading the bits in said shift register in parallel into said second check character buffer after a second serial shifting of the bits in said shift register has occurred subsequent to the loading of the contents of said second character buffer into said shift register, whereby multi-bit check characters are generated in said first and second check character buffers unique to the information that is sent and/or received as bits travel in said multi-line paths and bits are shifted serially in said shift register.

2. A communications adapter as set forth in claim 1, said first bit changing circuitry and said second bit changing circuitry each constituting an exclusive OR circuit having the said inputs and outputs as aforesaid.

3. A communications adapter as set forth in claim 1 and including a third bit changing circuitry in one of said lines of one of said multi-line buffer-register paths other than said lines in which said first and second bit changing circuitries are disposed, said third bit circuitry in the line in which it is disposed having an input thereby from the said buffer connected with this line and having a second input from said data carry storage device to have a bit in this storage device applied to the third bit changing circuitry so that the third bit changing circuitry has a bit output for a combination of bits on its said inputs and applied through the line in which said third bit changing circuitry is disposed to said shift register.

4. A communications adapter as set forth in claim 3, said third bit changing circuitry also having a third input which is connected with one of said inputs of one of the other of said bit changing circuitries to have a bit on the latter input applied to said third bit changing circuitry so that the third bit changing circuitry has a bit output for a combination of bits on its said three inputs and applied through the said line in which said third bit circuitry is disposed onto said shift register.

5. A communications adapter as set forth in claim 3, said shift register having eight bit positions with the number 1 bit position of the positions as consecutively numbered being at the unloading end of said shift register, said first bit changing circuitry being in the line of said first buffer-register path connected with the number 1 position of said shift register, said second bit changing circuitry being in the line of said second buffer-register path connected with the number 7 position of said shift register and said third bit changing circuitry being in the line of said first buffer-register path connected with the number 2 position of said shift register.

6. A communications adapter as set forth in claim 1, said shift register having eight bit positions with the number 1 position of the positions as consecutively numbered being at the unloading end of said shift register, said first bit changing circuitry being in the line of said first buffer-register path connected with the number 1 position of said shift register and said second bit changing circuitry being in the line of said second buffer-register path connected with the number 7 position of said shift register.

7. A communications adapter as set forth in claim 1 and including a shift register buffer, means for moving said plurality bit information to be sent or received into said shift register buffer, a third multi-line buffer-register connecting said shift register buffer with said shift register for loading the bits contained in said shift register buffer in parallel into said shift register, said data carry storage device being connected with the unloading end of said shift register so that a bit of said information is shifted on a preliminary serial shifting of the shift register into said data carry storage device and so that the bit is applied to an input of said first bit changing circuitry as aforesaid, and a third multi-line register-buffer path connecting said shift register with said shift register buffer so that the remaining bits of said information in said shift register after serial shifting of the shift register as just mentioned are moved back in parallel into said shift register buffer.

* * * * *